(12) United States Patent
Kozak

(10) Patent No.: US 7,171,871 B2
(45) Date of Patent: Feb. 6, 2007

(54) DAMAGED BOLT AND SCREW REMOVING DEVICES

(75) Inventor: Burton Kozak, Chicago, IL (US)

(73) Assignee: Eazypower Corporation, Chicago, IL (US)

( * ) Notice: Subject to any disclaimer, the term of this patent is extended or adjusted under 35 U.S.C. 154(b) by 0 days.

(21) Appl. No.: 11/254,451

(22) Filed: Oct. 20, 2005

(65) Prior Publication Data

US 2006/0037440 A1 Feb. 23, 2006

Related U.S. Application Data

(62) Division of application No. 10/831,391, filed on Apr. 23, 2004, now Pat. No. 6,978,697.

(60) Provisional application No. 60/465,506, filed on Apr. 25, 2003.

(51) Int. Cl.
*B25B 13/50* (2006.01)

(52) U.S. Cl. .......................................... 81/53.2; 81/441

(58) Field of Classification Search ................. 81/53.2, 81/441, 459; 408/210, 216, 217, 223–225, 408/227, 229, 230
See application file for complete search history.

(56) References Cited

U.S. PATENT DOCUMENTS

| | | | | |
|---|---|---|---|---|
| 2,480,648 | A * | 8/1949 | Harer | 81/53.2 |
| 4,111,078 | A * | 9/1978 | Seamon | 81/441 |
| 4,189,266 | A * | 2/1980 | Koslow | 408/224 |
| 6,761,089 | B2 * | 7/2004 | Bergamo | 81/53.2 |

* cited by examiner

*Primary Examiner*—D. S. Meislin
(74) *Attorney, Agent, or Firm*—Cherskov & Flaynik

(57) ABSTRACT

A bit for removing a broken fastener comprises a tip from which extend two or more notches separated by scraping surfaces formed from two-sided frusto-conically-shaped regions. The scraping surfaces are bounded on one side by a cutting edge and on the other side by a non-cutting edge and are configured to cut into the fastener when the bit is rotated in a direction opposite to the fastener's direction of engagement. Specific embodiments include configurations where the cutting edges extend at different angles with respect to the bit axis and where the scraping surfaces comprise a plurality of serrations.

4 Claims, 7 Drawing Sheets

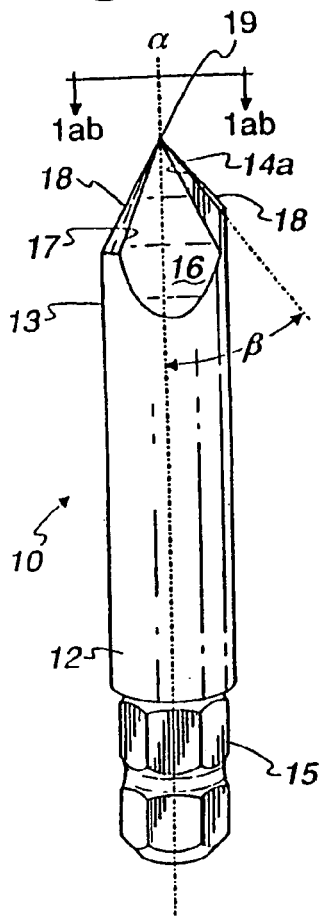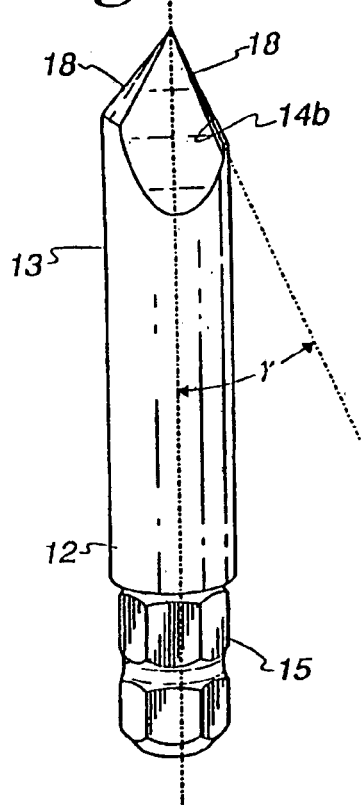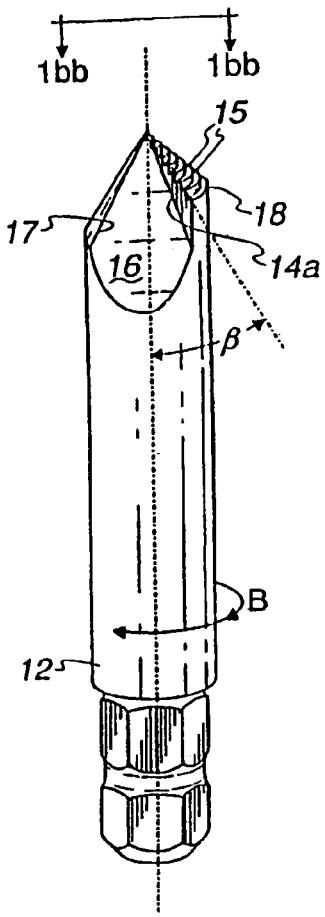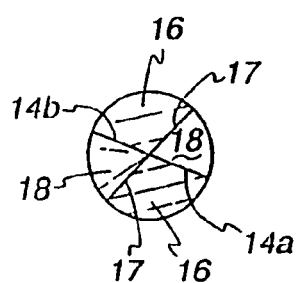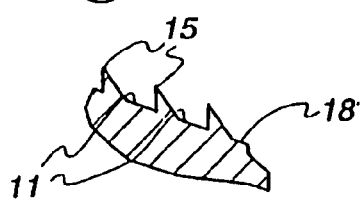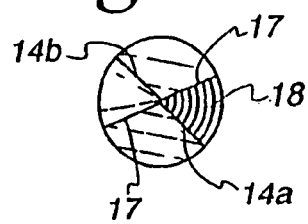

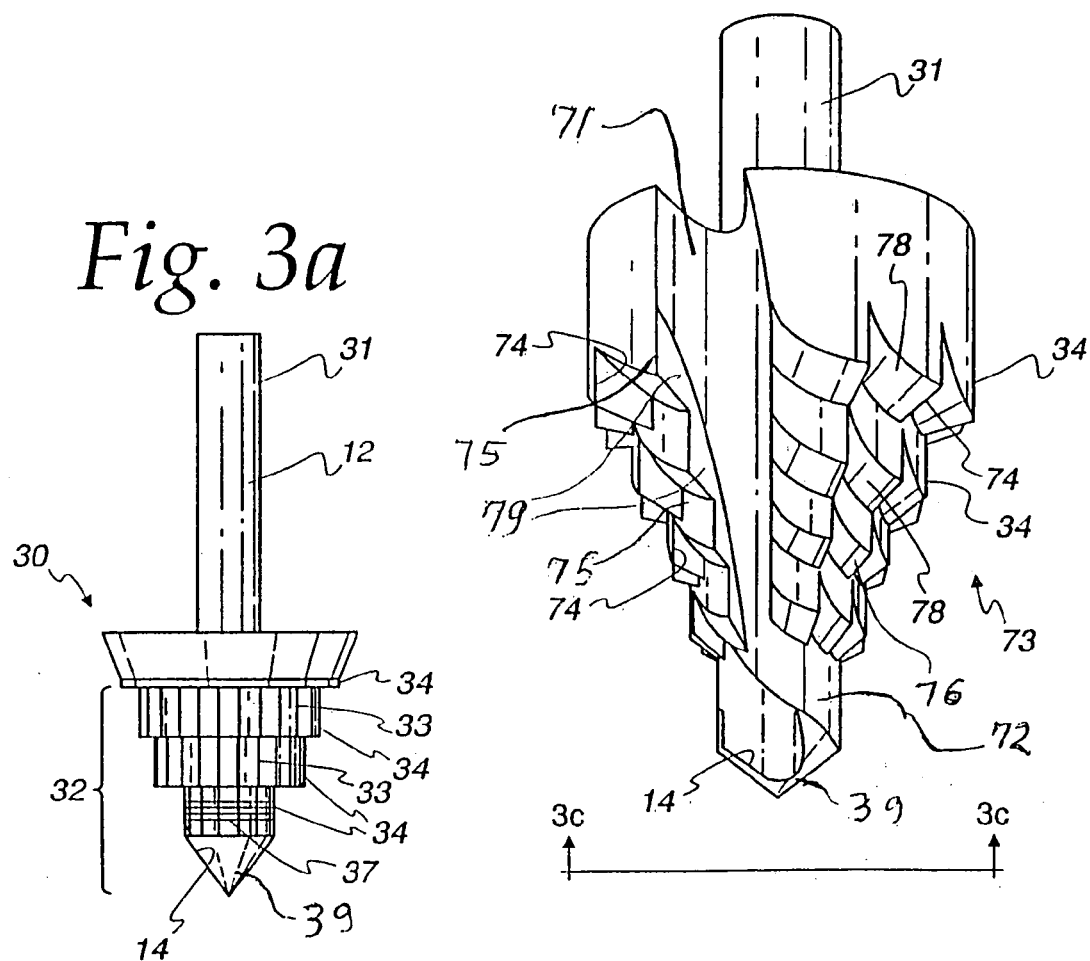
Fig. 3a
Fig. 3b
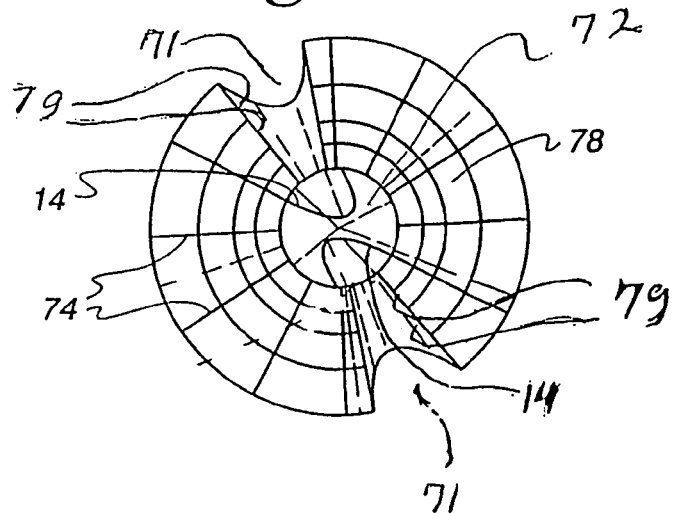
Fig. 3c

DAMAGED BOLT AND SCREW REMOVING DEVICES

The instant application is a Divisional of U.S. patent application Ser. No. 10/831,391 filed on Apr. 23, 2004, now U.S. Pat. No. 6,978,697 which claims the benefit of U.S. Provisional Patent Application No. 60/465,506, filed on Apr. 25, 2003.

BACKGROUND OF THE INVENTION

1. Field of the Invention

The present invention relates to the field of hardware tool bits, and more particularly, the present invention relates to a device for removing damaged fasteners still embedded or otherwise engaged with a workpiece.

2. Description of the Prior Art

The use of fasteners, such as screws, bolts, and other threaded joining devices continues to increase. However, the more a fastener is used, the more likely that it becomes rounded off, broken, or otherwise rendered useless. At that point, the fasteners must be removed, and/or the workpiece replaced or abandoned.

A myriad of screw removing bits exist. Generally, the bits are typical in that each bit has a first end and a second end. The first end is adapted to be received by a rotating chuck or a rotating tool shaft, such as the shaft of a screw driver, either manually or power-driven. The second end of the bit is configured to impart rotational torque to the fastener while the latter is still held fast by the workpiece.

The second end of the bit mimics the end of a standard drill bit. Several broken bolt extractors feature a left-handed cutting edge. For example, U.S. Pat. No. 4,777,850 discloses two such edges. However, such devices still require considerable power to impart the rotational torque necessary to "bite" into the fastener to begin left-handed extraction.

U.S. Pat. No. 6,595,730 B2 awarded to Bergamo on Jul. 22, 2003 discloses a bit for removing damaged screws. This device is designed to engage the exterior surface of the fasteners and not interior surfaces of the fastener. As such, "purchase" of the fastener by the device is relegated to that exterior surface.

A need exists in the art for a broken bolt or broken screw extraction device to facilitate easier removal of fasteners held tight by a workpiece. The device should be able to be utilized with hand-actuated handles or with electrically activated tools. The device should engage as much of the interior surface of a wayward fastener so as to decrease the likelihood of a spin off of the device from the fastener while concomitantly increasing the likelihood of extraction of the fastener with minimal force required.

SUMMARY OF THE INVENTION

It is an object of the present invention to provide a broken bolt or broken screw remover that overcomes many of the disadvantages of the prior art.

It is a further object of the present invention to provide a broken bolt/screw remover that requires only low levels of torque to extract a fastener. A feature of the invention is that the fastener has a pair of generally radially projecting cutting edges, with each of the cutting edges defining an angle with respect to the axis of the remover. An advantage of the invention is that the different cutting edge angles enhance the bite of the bit into interior surfaces of the fastener. The cutting edges also can contain serrations running substantially perpendicular to the longitudinal axis of the cutting edge to provide additional purchase of the fastener.

Yet another object of the present invention is to provide a broken bolt/screw remover which also has drilling function. A feature of the invention is that it comprises a left-handed countersink drill bit containing serrations which extend generally longitudinal to the axis of the bit. An advantage of the invention is that the drilling feature of the remover causes more interior surfaces of the fastener to be made available to the cutting edges of the serrations, and assures withdrawal of the remover with the fastener attached to the bit while the threaded cavity in the workpiece is left intact.

Still another object of the present invention is to provide a step drill with fastener remover capabilities. A feature of the invention is a plurality of generally longitudinally-extending serrations interposed between axially spaced steps in the drill bit. These serrations extend in a left hand cutting fashion. An advantage of the invention is that this one embodiment can be utilized to extract fasteners having a myriad of different shank diameters.

BRIEF DESCRIPTION OF THE DRAWING

The foregoing invention and its advantages may be readily appreciated from the following detailed description of the invention, when read in conjunction with the accompanying drawing in which:

FIG. 1aa is an elevational view of the invented bit, in accordance with features of the present invention;

FIG. 1ab is a top view of FIG. 1aa taken along the line 1ab—1ab;

FIG. 1ac is an elevational view of FIG. 1aa rotated 180 degrees around its longitudinal axis, in accordance with features of the present invention;

FIG. 1ba is an elevational view of the invented bit with serrated regions, in accordance with features of the present invention;

FIG. 1bb is a top view of FIG. 1ba taken along the line 1ba—1ba;

FIG. 1bc is an expanded view of the invented bit with serrated regions depicted in FIG. 1ba, in accordance with features of the present invention FIG. 1ca is an elevational view of an alternate invented bit with serrated regions, in accordance with features of the present invention;

FIG. 1cc is an elevational view of an alternate invented bit with serrated regions, in accordance with features of the present invention;

FIG. 1cd is a top view of FIG. 1ca taken along the line 1cd—1cd;

FIG. 3a is a side view of a step drill bit with cutting threads, in accordance with features of the present invention;

FIG. 3b is a side view of an alternate step drill bit with serration portions, in accordance with features of the present invention;

FIG. 3c is a top view of FIG. 3b taken along the line 3c—3c;

DETAILED DESCRIPTION OF THE INVENTION

Figure 1C:
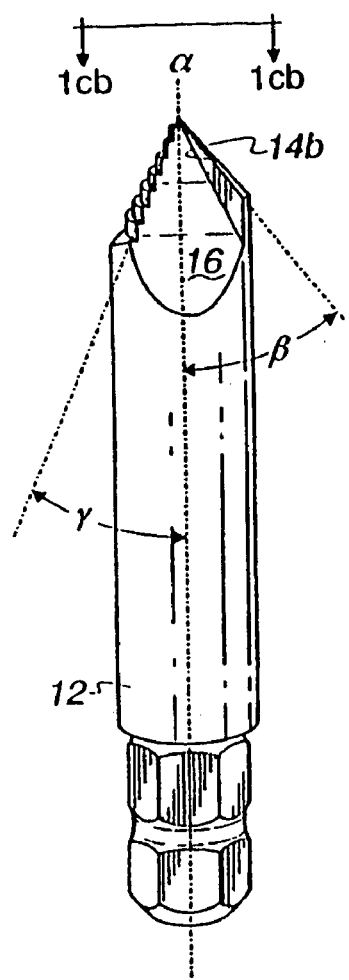
FIG. 1cb is a top view of FIG. 1ca taken along the line 1cb—1cb.
Figure 1C:
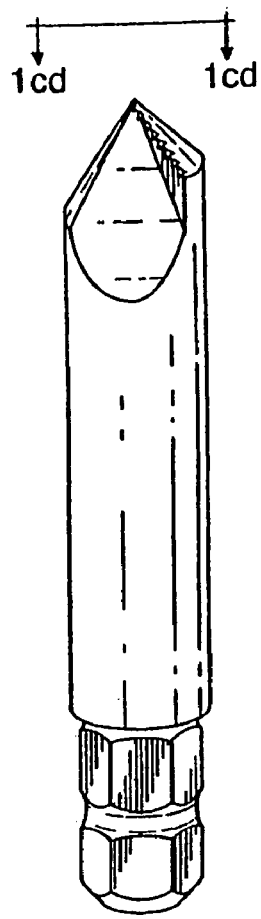
Figure 1C:
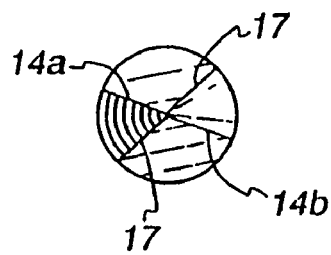
Figure 1C:
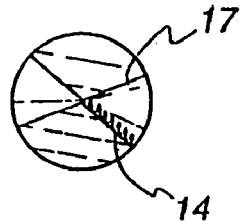

The present invention provides a bit configuration and various bit/threaded configurations on a single device to allow for easier fastener extraction.

FIG. 1aa provides salient features of the invented bit, the bit designated generally as numeral 10. As with any typical bit, the bit generally comprises a shaft 12 with a first end 13 terminating in a tip 19. While the tip 19 is depicted as generally pointed, standard split tips also can be utilized such that the cutting surfaces 14 are not coplanarly aligned with each other or with the tip. This split point configuration minimizes and even prevents "walk out" of the bit from the workpiece. As such, the configuration serves as a means for maintaining the bit on the fastener during rotational motion of the bit.

A second end 15 of the bit is configured to be received in a chuck and as such, a cross section of the second end can be circular, hexagonal, polygonal or any convenient shape to facilitate the tip being acted upon with rotational torque.

The bit typically comprises two longitudinally extending notches 16, each of the notches terminated on one side with a leading or cutting edge 14. The other side of the notch is bounded by a noncutting edge 17. Both the cutting edge 14 and noncutting edge extend from a point proximal to the axis α to the bit periphery. Only one or more than two extending notches are acceptable, but, for the sake of specificity, the following discussion will focus on two-notched configurations. The cutting edge 14 faces in a counter-clock-wise direction for extracting a fastener with a clockwise direction of engagement and conversely for a counterclockwise fastener. Between the cutting edge and noncutting edge is a scraping surface 18 which can be described as a section of a frusto-conically-shaped region. The scraping surface is bound by the cutting edge 14 and noncutting edge 17.

The cutting edge 14 defines an angle β to the longitudinal axis α of the bit. The opposite side of the bit shown in FIG. 1ac defines a very similar configuration, except that its cutting edge 14b is arranged at an angle (γ) to the axis α of the bit that is different than the angle β. FIG. 1ab is a top view of FIG. 1aa taken along the line 1ab—1ab.

Surprisingly and unexpectedly, the inventor has found that the difference in the cutting edge angles facilitates greater bite into the shank of the broken fastener. The first angle β can differ from the second angle γ by as much as 50 percent. For example, whereas the first angle is 45 degrees, the second angle γ is 30 degrees. Ideally, the sum of the angles is such that any remaining slot of a broken fastener can simultaneously contact at least portions of each of the cutting edges 14 and 14b. While the cutting edges depicted in FIG. 1aa are rectilinear, in an alternative embodiment the cutting edges define a spiral configuration oriented opposite to the fastener's direction of engagement.

As an alternative to the bit having a straight cutting edge 14b as depicted in FIGS. 1aa and 1ac, one of the edges 14a or more edges can be serrated, as depicted in FIG. 1ba. (FIG. 1bb is a top view of FIG. 1ba taken along the line 1bb—1bb.) The serrations 15 start along at least a substantial length of the cutting edge, and extend transversely from the cutting edge in a right handed direction (i.e. opposite the direction of the small arrow labeled B, and circumferentially parallel to the periphery of the bit. The serrations can extend completely across the frusto-conical surface 18 so as to terminate on the noncutting edge 17 (See FIGS. 1ba and 1ca), or else the serrations can stop on the surface 18 between the cutting edge 14 and noncutting edge 17 (See FIG. 1cc and FIG. 1cd which is a top view of FIG. 1cc taken along the line 1cc—1cc). The serrations define on the surface 18 a series of teeth 15 with gaps 19 between the teeth, as shown in the detail in FIG. 1bc. A device with more than one scraping surface with serrations provides additional purchase synergy as discussed infra.

FIG. 1ca is analogous to FIG. 1ac except it is the scraping surface at an angle γ with respect to the axis that bears the serrations. FIG. 1cb is a top view of FIG. 1ca taken along the line 1cb—1cb.

The inventors have found that having one cutting edge serrated, and the immediate next cutting edge smooth enhances "bite" of that smooth cutting edge into the fastener for easier extraction from the workpiece. This alternating serrated/smooth cutting edge configuration provides a double action whereby the serrated edge roughens the topography of the fastener surface, thereby serving as a means for enhancing purchase of the smooth cutting surface with the fastener.

A plurality of cutting edges on the same bit can be serrated (even on adjacent edges as opposed to a smooth edge intermediate two serrated edges), with one configuration having edges biting into the fastener at different axial locations from each other. The inventive feature of varying the angle of attack of the edges (e.g., the angles β and γ, discussed supra) will minimize the possibility of adjacent serrated edges destroying the carcass of the fastener before the bit can anchor into the carcass for removal.

Figure 1D:
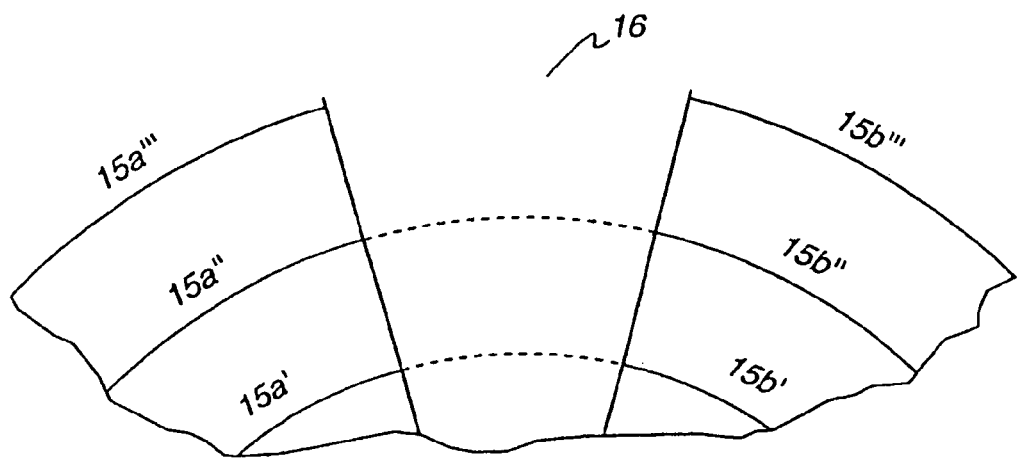
FIG. 1da is a detailed view of the serrated regions depicted in FIG. 1ba, in accordance with features of the present invention FIG. 1db is a detailed view of an alternate configuration of the serrated regions depicted in FIG. 1ba, in accordance with features of the present invention.
Figure 1D:
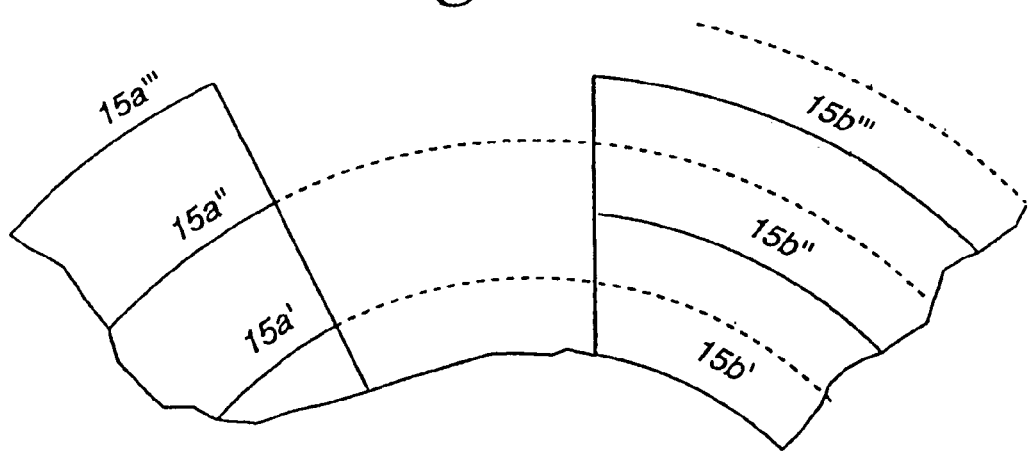

There are many possible variations in the configuration of the serrations. For instance, a possible embodiment is where serrations are provided on two cutting edges that are at the same angle with respect to the bit axis, with the serrations defining two sets of teeth 15 with separated by gaps 11. FIGS. 1da and 1db depict two possible variations within this embodiment. In FIG. 1da corresponding teeth 15a'–15b', 15a"–15b", 15a'''–15b''', etc . . . on the two surfaces are azimuthally aligned across a notch 16 while in FIG. 1db corresponding teeth are axially displaced with respect to those on the other side of the notch so as to be azimuthally aligned with the gaps 11 on the other side. The staggered serration configuration provides a means for serrations biting at different radial and axial regions of the fastener.

Figure 6A:
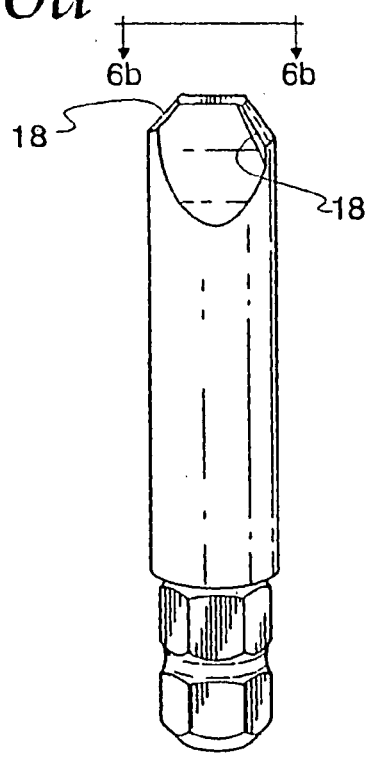
FIG. 6a is an elevational view of a modification of the invented bit, in accordance with features of the present invention.
Figure 6B:
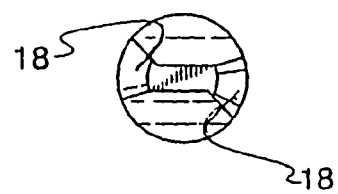
FIG. 6b is a top view of FIG. 6a taken along the line 6b—6b.

Furthermore, it should be noted that the invented bits need not terminate into a sharp apex. Rather, bits terminating in rounded or blunted apexes are suitable for fasteners having particularly large-diameter shanks or for fasteners where a central cavity has been fashioned during a previous attempt to extract the fastener. FIG. 6a depicts an exemplary embodiment of such a blunted apex bit where the scraping surfaces 18 are inclined at different angles with respect to the axes (See FIG. 1aa) and may also comprise serrations (See FIG. 1ba). FIG. 6b is a top view of FIG. 6a taken along the line 6b—6b.

Figure 2A:
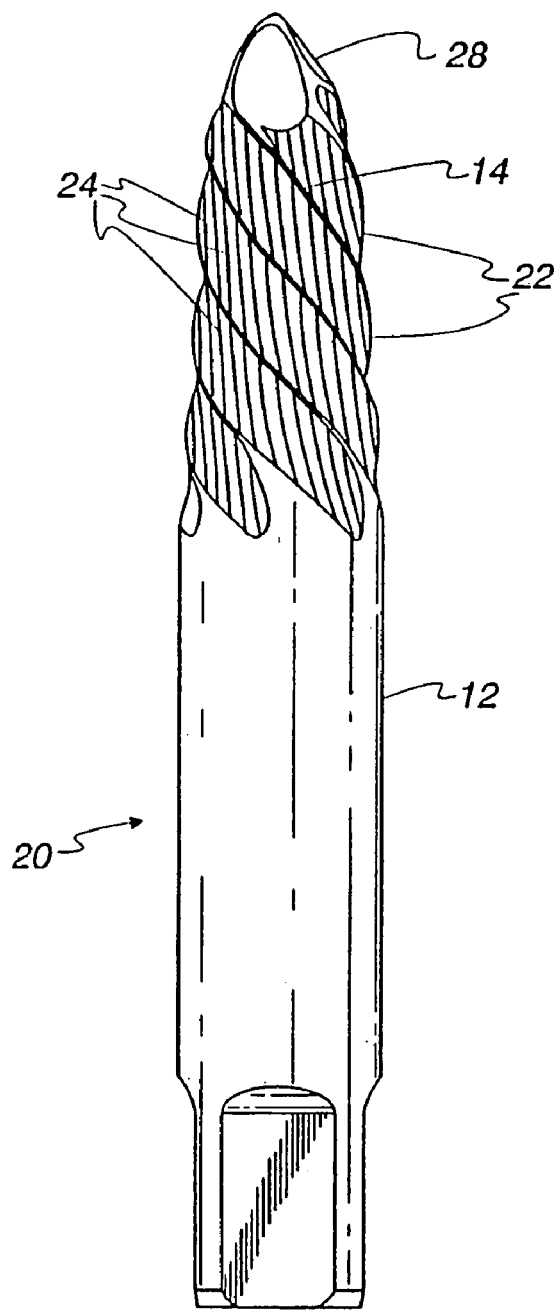
FIG. 2a is an elevational view of an easyout bit further defining a left handed drill bit with serration portions, in accordance with features of the present invention.

FIG. 2a depicts an embodiment of the invented broken fastener remover, designated as numeral 20, which comprises a standard "easy out" configuration (whereby the easyout defines a tapering, left handed spiral). This embodiment comprises a plurality of left-handed cutting surfaces 22 terminating in a drill bit 28. The bit 28 can have the configuration described in FIGS. 1aa and 1ba.

Figure 2B:
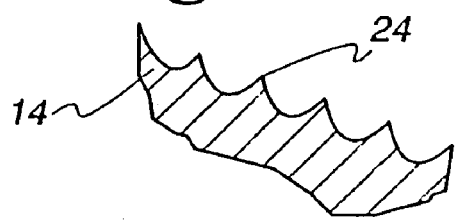
FIG. 2b is an expanded view of the cutting edge of FIG. 2a, in accordance with features of the present invention.

Also, the fastener remover bit 20 with the easyout configuration can include a plurality of serrations 24 along the cutting surface(s) 22 of the bit 20, these cutting surfaces defining helical regions extending circumferentially along the periphery of the bit 20. The serrations can exist along one or more than one of the cutting edges 14 of the bit. A salient feature of this embodiment is a plurality of left hand serrations 24 which extend preferably (but not necessarily) parallel to the longitudinal axis α of the shank 12 of the bit. These serrations bite in to the recess of the screw head. FIG. 2b depicts a detail of a cutting edge 14 showing that the serrations 24 define teeth 25 on the cutting edge 14 of the spiral cutting surface 22.

FIGS. 3a and 3b depict a fastener removal bit designated as numeral 30. This removal bit 30 has a first end 31 adapted to be received by a rotating handle or chuck (not shown). A second end 32 of the removal bit 30 terminates in a bit configuration 39 similar to that depicted in FIGS. 1aa–1ba. Generally, the cutting region of the removal bit comprises a step drill configuration 32 and serration edges 33 positioned intermediate the steps 34 of the configuration such that the serrations extend radially from radially-facing surfaces of the steps. Also, these serration edges 33 generally extend parallel to the longitudinal axis of the bit 30, defining a left hand (counter-clockwise) drill cutting configuration.

In FIG. 3a, the steps 34 are axially spaced and otherwise arranged so that various fastener shank diameters can be accommodated with the removal bit 30. As such, steps have self-tapping screw threads 37 which are spaced apart to provide the anchoring necessary to withdraw the fastener in an axial direction once the bit is buried into the fastener shank, while the threaded cavity in the workpiece is left intact.

FIG. 3b depicts an alternative step drill bit 73, wherein the steps 34 are configured to comprise counter-clockwise cutting edges 74 and scraping surfaces 78. More specifically, the bit 73 has a first end that terminates in a tip 72 with two or more notches 71 extending longitudinally along the shaft 31 from the tip, said notches separated by a plurality of cutting edges 79, said edges 74 arranged on scraping surfaces 75 which are positioned along the axis and successively radially displaced further from the axis in a direction from the first end to the second end. The cutting edges are 79 configured to cut into the fastener in progressive radial steps when the bit is rotated in a direction opposite to the fastener's direction of engagement at the same time as the cutting edges cut azimuthally into the fastener. Depending regions of said surfaces 75 comprise a plurality of teeth 76, each of said teeth defining one cutting edge 74 adapted to bite the fastener in a direction along the longitudinal axis of the fastener. Thus each of the steps 34 constitutes a hole saw that bites into the fastener as the drill bit advances into the fastener. FIG. 3c is a view of FIG. 3b taken along line 3c—3c. The embodiment described in FIG. 3b may also comprise features described in conjunction with the embodiments described in FIGS. 1aa and 3a. Thus the bit 73 may comprise serration edges protruding from said surfaces 75 and self-tapping screw threads on one or more of said surfaces. Also, two or more cutting edges 79 may have dissimilar angles with respect to the axis.

Figure 4A:
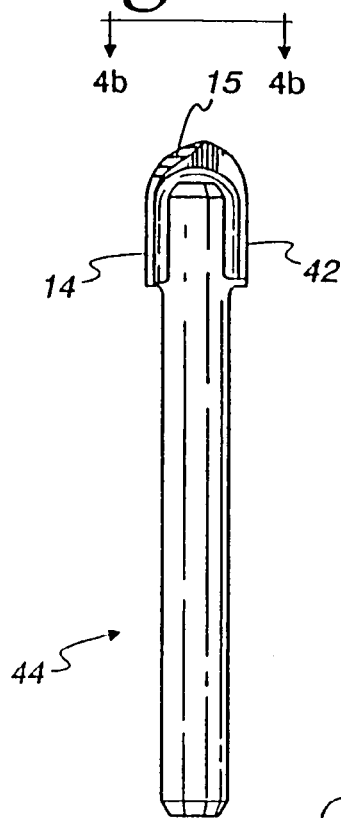
FIG. 4a is a perspective view of an alternative fastener extraction device, in accordance with features of the present invention.
Figure 4B:
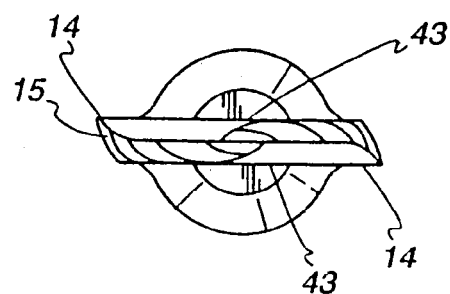
FIG. 4b is a top view of FIG. 4a taken along the line 4b—4b.

FIG. 4a depicts another bit, designated generally as numeral 40 and FIG. 4b is a top view of FIG. 4a taken along the line 4b—4b. This bit com-prises a "glass drill" 44 in the shape of a solid rod, terminating with a carbide insert 42. The insert 42 consists of a 2-notch bit as depicted in FIGS. 1aa and 1ba in the limit where each of the notches 43 is between 150 and 180 degrees. Thus the present embodiment resembles a flat "spade" bit positioned transversely to the longitudinal axis of the rod. The distal end of the insert defines a plurality of left handed cutting edges 14, each which may or may not be at the same angle relative to the longitudinal axis of the rod. Optionally, one or both of these edges define scraping surfaces that contain serrations 15 extending transversely from the cutting edge. Each of these edges are configured in a left handed configuration, so that right-hand fasteners are extracted thereby. However, and with all bits depicted herein, the cutting edges can be configured as right-hand facing so as to facilitate removal of left-handed fasteners. FIG. 4b is a view of FIG. 4a taken along line 4b—4b.

Figure 5A:
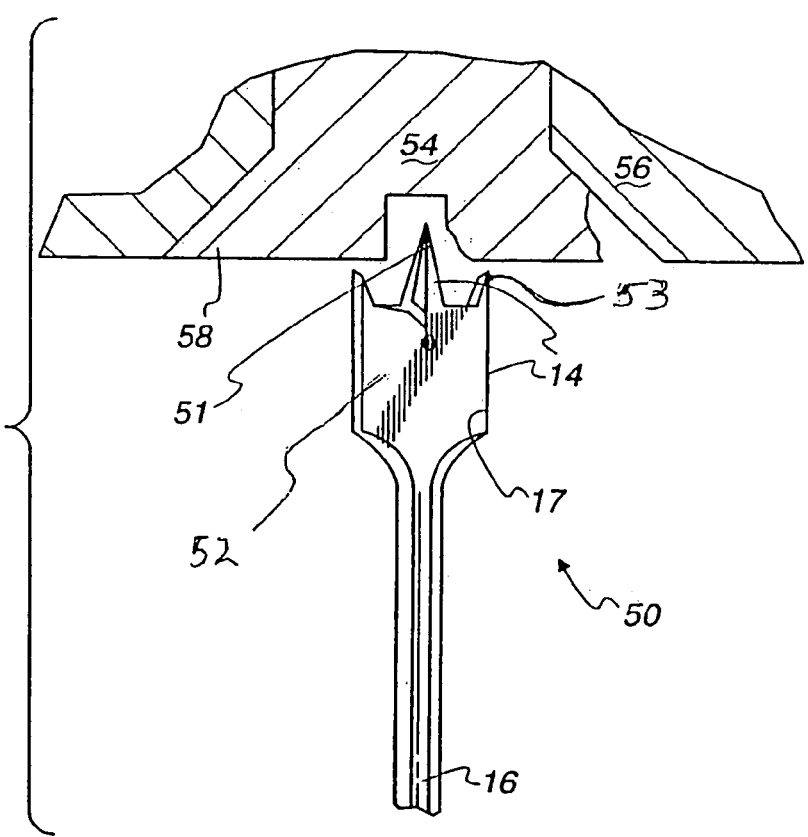
FIG. 5a is a modified spade flat, in accordance with features of the present invention.

The invented screw/bolt remover configuration can be integrally molded with other typical tool bits. For example, and as depicted in FIG. 5a, elements of the invented configuration depicted in FIGS. 1aa and 1ba can be integrally molded with a typical spade flat bit (FIG. 5a is a view of spade flat shown in slot of broken fastener) to optimize an already familiar tool. A typical spade drill comprises a shank adapted to be received in the chuck of a torque-imparting tool, the shank terminating in a flat cutting element often called a "spade flat." The spade flat typically comprises cutting edges parallel to the shank and a cutting tip aligned with the shank and/or side cutting tips parallel to the shank but laterally displaced from the axis of the shank.

Figure 5B:
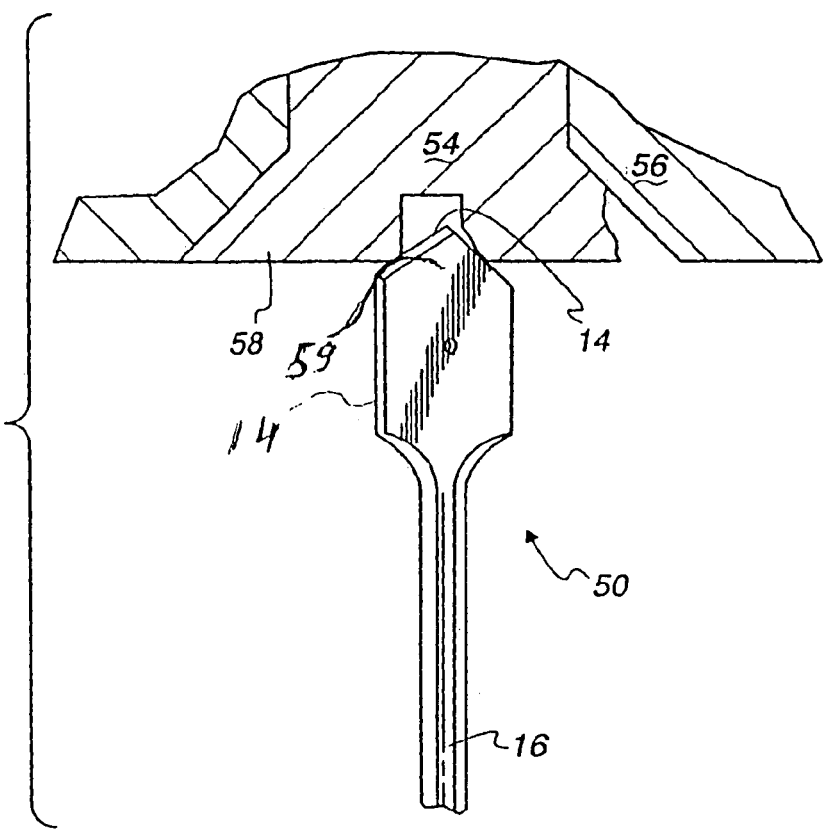
FIG. 5b is an alternate modified spade flat, in accordance with features of the present invention.

In FIGS. 5a and 5b the spade flat hybrid 50 is depicted as positioned at the slot of a broken screw 54, the screw countersunk into a workpiece 56. In operation, the cutting edges 14 of the spade flat hybrid 50 burrow into the head 58 of the screw. The center of the slot of the screw is shown as a pilot hole for the user of the hybrid bit 50.

In FIG. 5a the invented hybrid tool, designated as numeral 50 defines cutting edges 14 in a counter-clockwise facing position of the spade flat 52 and on a tip 51 similar to either of the configurations depicted in FIGS. 1aa and 1ba. The bit 50 also comprises side cutting tips 53.

In FIG. 5b the spade flat terminates in a triangular cutting element 59.

As with the embodiments depicted in FIG. 1, the spade flat can alternatively include a non-cutting edge and a scraping surface, having either a smooth or serrated topology.

The spade flat depicts a ¼" size. However, this is for example only. Rather, a myriad of spade flat sizes are suitable, depending on the diameter of the residual fastener head 58 or shank remaining.

Another embodiment of a spade flat is depicted in FIG. 5b where the cutting edges 14 assume a triangular shape.

It should be noted that the above described embodiments all depict left handed cutting configurations. However, if left handed fasteners are to be removed, then the herein disclosed embodiments with right handed cutting configurations would be utilized.

It should be further noted that the opposed cutting edges in each of the above-disclosed embodiments generally are configured at angles to the longitudinal axis of the respective bit which are either identical to each other, or different from each other, on the same bit.

Also, the invented bits can be configured to include a means for preventing the bits from dislodging from broken fasteners once engagement with said fasteners occurs. In this regard, "finders" may be installed. These are accessories associated with, and co-axial to, the shanks of the bits and in slidable communication therewith. Generally configured as cylinders or tubes, the finders are adapted to slide over the periphery of a fastener which is held fast in a work piece. As such, the finders maintain the bit in a position coaxial to the longitudinal axis of the fastener to assure adequate embedding of the bit into the fastener. The finder also prevents jumping or skipping of the bit from the fastener to adjacent surfaces of the workpiece, thus preventing marring or scuffing of said workpiece.

Another addition to the invented device is the positioning of a collar or radial projection about the circumference of the device. The collar or projection would be positioned intermediate the first and second end of the device and serve as a means for preventing penetration of the device into the fastener beyond the distance defined by the tip 19 of the device and the position of the collar.

While the invention has been described in the foregoing with reference to details of the illustrated embodiment, these details are not intended to limit the scope of the invention as defined in the appended claims.

The invention claimed is:

1. A bit for removing a broken fastener having a direction of engagement, said bit comprising:
   a) an elongated shaft with a longitudinal axis, said shaft having a first end, and a second end, said first end terminating in a tip;
   b) a plurality of cutting edges extending radially from said tip, said cutting edges configured to cut into the fastener when the bit is rotated in a direction opposite to the fastener's direction of engagement, wherein each cutting edge defines an angle to the longitudinal axis of the bit;
   c) said second end of the shaft configured to be received by a chuck of a tool which provides rotational torque; and
   d) said cutting edges define scraping surfaces and wherein said surfaces comprise serrations, wherein each serration defines a crest and a gap and the crests of the serrations on a first cutting edge are aligned with the gaps of corresponding serrations on a second cutting edge and wherein said crests and said gaps lie at the same radial distance from the longitudinal axis.

2. The bit as recited in claim 1 wherein the angles of the edges are equal.

3. The bit as recited in claim 1 wherein the angles of at least two of the edges are unequal.

4. The bit as recited in claim 1 wherein said serrations define a plurality of teeth on the cutting edges.

* * * * *